United States Patent [19]

Smith et al.

[11] Patent Number: 5,027,741

[45] Date of Patent: Jul. 2, 1991

[54] FIRE ESCAPE DEVICE

[76] Inventors: John R. Smith, 9947 Siegen La., Baton Rouge, La. 70810; David M. Bradley, III, 11071 Kevin Rd., Biloxi, Miss. 39532

[21] Appl. No.: 523,670

[22] Filed: May 15, 1990

[51] Int. Cl.[5] .............................. G01D 21/00

[52] U.S. Cl. .............................. 116/205; 116/DIG. 17; 138/104; 182/18

[58] Field of Search .............................. 116/205, DIG. 17; 40/316, 542, 570; 138/104; 182/18, 230; 434/113, 226

[56] References Cited

U.S. PATENT DOCUMENTS

| | | | |
|---|---|---|---|
| 3,408,025 | 10/1968 | Davis | 182/230 |
| 4,266,579 | 5/1981 | Deiss | 138/127 |
| 4,350,547 | 9/1982 | Kanao | 156/143 |
| 4,401,050 | 8/1983 | Britt et al. | 116/205 |
| 4,459,168 | 7/1984 | Anselm | 156/143 |
| 4,490,200 | 12/1984 | Dillon | 156/143 |
| 4,633,912 | 1/1987 | Pilkington et al. | 138/132 |
| 4,844,000 | 7/1989 | Clement | 116/205 |

FOREIGN PATENT DOCUMENTS

| | | | |
|---|---|---|---|
| 0625132 | 8/1961 | Canada | 156/143 |
| 2310087 | 9/1973 | Fed. Rep. of Germany | 156/143 |
| 813227 | 5/1937 | France | 40/542 |
| 23401 | of 1904 | United Kingdom | 40/542 |
| 2058280 | 4/1981 | United Kingdom | 156/143 |

*Primary Examiner*—William A. Cuchlinski, Jr.
*Assistant Examiner*—W. Morris Worth
*Attorney, Agent, or Firm*—Reginald F. Roberts, Jr.

[57] ABSTRACT

A device which provides an escape route from a fire. In a first aspect, the present invention provides a directional fire hose which enables a person a person, even in a dark and smoke-filled environment caused by a fire, to follow the fire hose in a direction away from the fire and toward safety. In a second aspect, the invention provides a directional carpet which enables a person, even in a dark and smoke-filled environment, to escape from a burning house or building. The invention is particularly useful for volunteer fire-fighters, inexperienced fire-fighters, and crewmen on a seagoing vessel or platform at sea.

6 Claims, 4 Drawing Sheets

FIRE ESCAPE DEVICE

BACKGROUND OF THE INVENTION

The present invention relates to an emergency escape device. More particularly, the invention relates to a device which provides an escape route from a fire, especially in a burning building or from the hold of a ship.

When fire-fighters enter a burning building and are preoccupied with saving lives, it is easy for them to get disoriented and lose their sense of direction. In conditions of darkness and heavy smoke, firemen are especially likely to become disoriented, particularly if they are inexperienced and have received minimal training in fighting fires. Under these same conditions, occupants of the building have the same problems.

There exists, then, a real and urgent need to provide a device which is capable of directing a person away from the fire and toward safety. The present invention addresses this need and provides a solution for this problem. The invention is particularly useful for volunteer fire-fighters, inexperienced fire-fighters, and crewmen on a seagoing vessel or platform at sea.

SUMMARY OF THE INVENTION

In general, the present invention in one aspect provides a fire escape device. The escape device comprises a path-providing member having first and second ends. Directional means are associated with the path-providing member, for finding, in the dark and without using electrical power, the first and second ends of the path-providing member. The path-providing member may, e.g., be a hose, a carpet, or a floor in a house or building.

In a second aspect, the present invention provides a fire hose which includes safety features enabling a person to follow or track the hose in a direction leading away from a fire and in a direction leading to escape and safety. The directional fire hose of the present invention comprises a fire hose having first and second ends. The first end of the hose is adapted for connection to a source of water. The second end of the hose is adapted for connection to a nozzle. Directional means for determining, in a dark and smoke-filled environment, and without using electrical power, the direction of the first and second ends of the hose, are associated with the fire hose, thereby enabling a person to escape from the fire by following or tracking the hose toward the first end of the hose, which is more distant from the fire.

In a third aspect, the present invention provides an article for converting a fire hose into a directional fire hose made in accordance with the principles of the present invention. The article comprises (a) indicia for finding, in the dark and without using electrical power, the directions leading to the first and second ends of the fire hose; and (b) means for attaching the indicia to the fire hose.

By a path-providing member is meant a member which provides, is capable of providing, or is adaptable to providing or defining a path.

By "associated with" is meant attached or attachable to.

DETAILED DESCRIPTION OF THE INVENTION

More specifically, reference is made to FIGS. 1–8, in which are shown several embodiments of the present invention.

Figure 1:
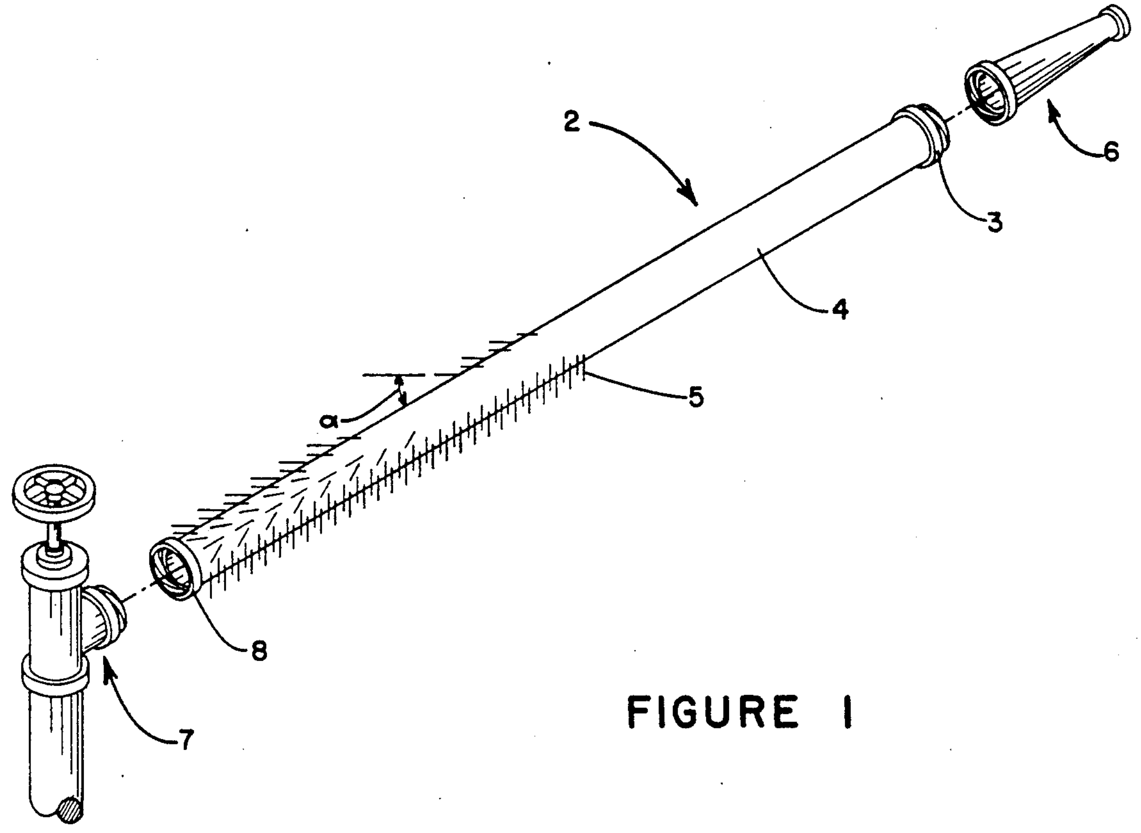
FIG. 1 is an exploded view of a first embodiment of a directional fire hose and nozzle made in accordance with the principles of the present invention.

FIG. 1 represents a first embodiment of a directional fire hose made in accordance with the principles of the present invention. The fire hose is generally designated by the numeral 2. FIG. 1 also shows a nozzle, generally designated by the numeral 6, and a source of water, generally designated by the numeral 7. The drawing is an exploded view of the fire hose 2, nozzle 6, and source of water 7.

The directional fire hose 2 comprises a conventional fire hose 4 to the outer surface of which are attached a plurality of fire-resistant fibers 5. The fire hose 2 is adapted at one end, hereindesignated its first end 8, to be connected to a source of water 7. The water supply 7 may be a fire hydrant, a second fire hose, or other means of supplying water under pressure. At its other end, hereindesignated the second end 3, the hose 2 is adapted to be connected to a conventional nozzle 6 of the type used in fighting fires. The means and methods employed in connecting the fire hose 2 to the water supply 7 and nozzle 6 are the same as those used in making such connections with conventional, state-of-the-art fire hoses.

Preferably, the directional fire hose 2 is long and flat when not in use, and cylindrical when charged with water. It would come in various lengths and diameters. The lengths might range from about fifty feet to about two-hundred feet. The diameter could vary from about one inch to about three inches, with diameters of one inch, one and one-half inches, two inches, two and one-half inches, and three inches being preferred.

The fire hose 4 is preferably a standard fire hose of canvas bonded to a rubber hose. The rubber hose should withstand from about one-hundred and fifty to about three hundred pounds of water pressure. Preferably, the hoses 2 and 4 have brass male and female hose couplings. Even more preferably, the couplings are threaded.

The fibers 5 are preferably woven into the canvas surface of the hoses 2 and 4. The fibers 5 are stiff enough to maintain a substantially constant angle, alpha, with the surface of the hoses 2, 4. The fibers 5 effectively form a brush surface surrounding the hoses 2, 4. This brush-type surface would be rough to the touch in the direction of the fire, i.e. in a direction toward the second end 3 of the hose 2, and smooth to the touch in the opposite direction leading to the first end 8 of the hose 2, i.e: in a direction leading to the source of water 7.

The fire-resistant fibers 5 may be made from any fibrous fire-resistant material, a number of which are known in the art. Poly(tetrafluoroethylene), marketed as TEFLON, a registered trademark of the Dupont Company, is an example of such a material that is preferred in the context of the present invention.

The fibers 5 define an angle alpha ($\alpha$) with the outer surface of the fire hose 2. The magnitude of alpha is generally from zero to about eighty degrees. Preferably, the magnitude of alpha is from about twenty degrees to about seventy degrees. Even more preferably, the magnitude of alpha is from about thirty degrees to about sixty degrees. Most preferably, the magnitude of alpha is from about forty degrees to about fifty degrees.

The configuration and structure of the fire hose 2 are such that a firefighter, even one suffering some disorientation and working in a dark, smoke-filled atmosphere, is able to ascertain the direction of the water supply 7 by passing a hand over and along the outer surface of the fire hose 2 without having to remove a glove. If the outer surface of the hose 2 feels rough and resistant to the fireman, he or she is made aware that the direction chosen manually is in the general direction of the nozzle 6. Since that end 3 of the hose 2 is situated nearer the fire, the fireman knows that water and safetY lie in the opposite direction, at the other end 8 of the hose 2. Passing the hand in that direction along the surface of the hose 2 will confirm this to be the case: the manual passage will feel smooth and non-resistant. By following the hose 2 in the direction of the end 8, which is the general direction in which the fibers 5 point, the fireman can readily choose a path leading away from the fire and toward safety.

Figure 2:
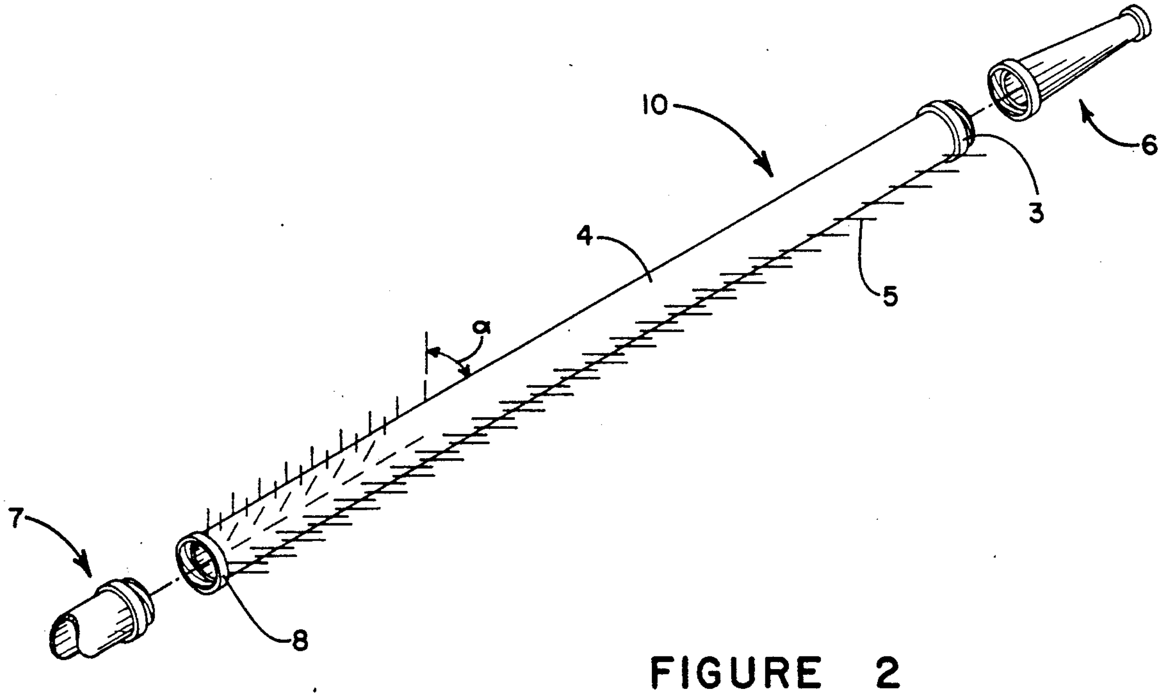
FIG. 2 is an exploded view of a second embodiment of a directional fire hose and nozzle made in accordance with the principles of the present invention.

FIG. 2 shows a second embodiment 10 of a directional fire hose made in accordance with the principles of the present invention. The second embodiment 10 differs from the first embodiment 2 by virtue of the direction of inclination of the fibers 5, which in FIG. 2 are seen to point in the general direction of the second end 3 of the fire hose 10. In seeking safety, a fireman would follow the hose 10 in a direction opposite to that in which the fibers 5 point, determined as described above by passing one's hand along the outer surface of the hose 10. The embodiment 2 is preferred, for obvious reasons.

Figure 3:
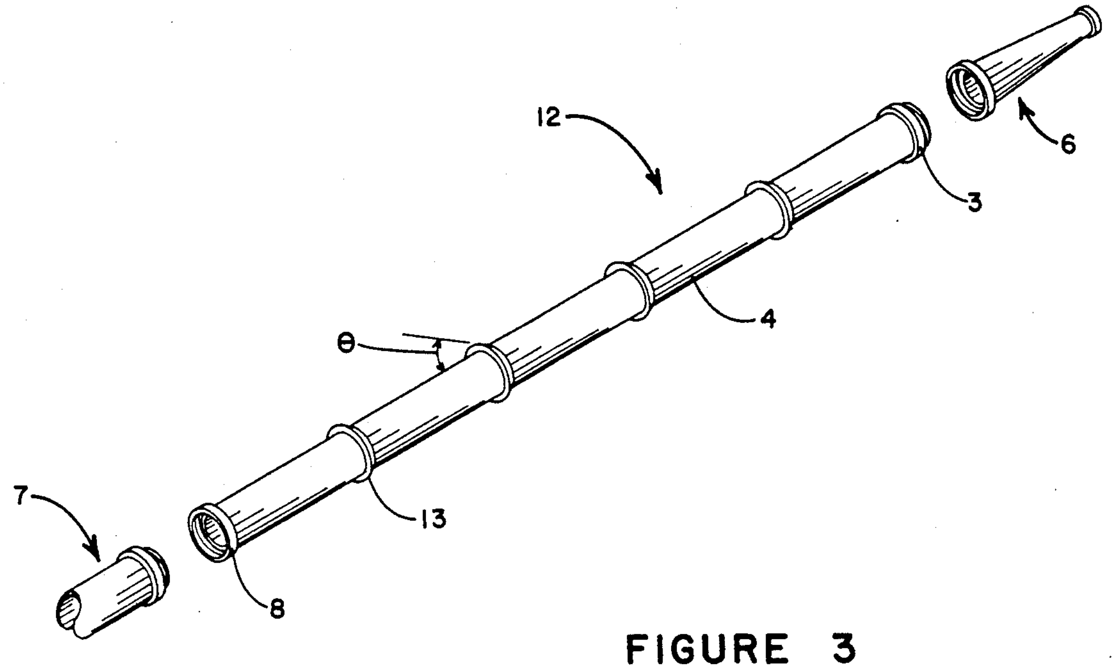
FIG. 3 is an exploded view of a third embodiment of a directional fire hose and nozzle made in accordance with the principles of the present invention.

FIG. 3 shows a third embodiment 12 of a fire hose made in accordance with the principles of the present invention. In this embodiment 12, the fire hose includes a plurality of fire-resistant annular members 13 attached to the outer surface of the hose 12. The annular members 13 define an angle theta ($\theta$) with the outer surface of the hose 12, and are inclined in the general direction of the first end 8 of the hose 12. The magnitude of theta is from zero to about eighty degrees, preferably from about twenty to about seventy degrees, even more preferably from about thirty to about sixty degrees, and most preferably about forty to about fifty degrees. The annular members 13 perform the same function in the same way as the fibers 5 in the first embodiment 2. They are made of the same type of material as the fibers 5.

Figure 4:
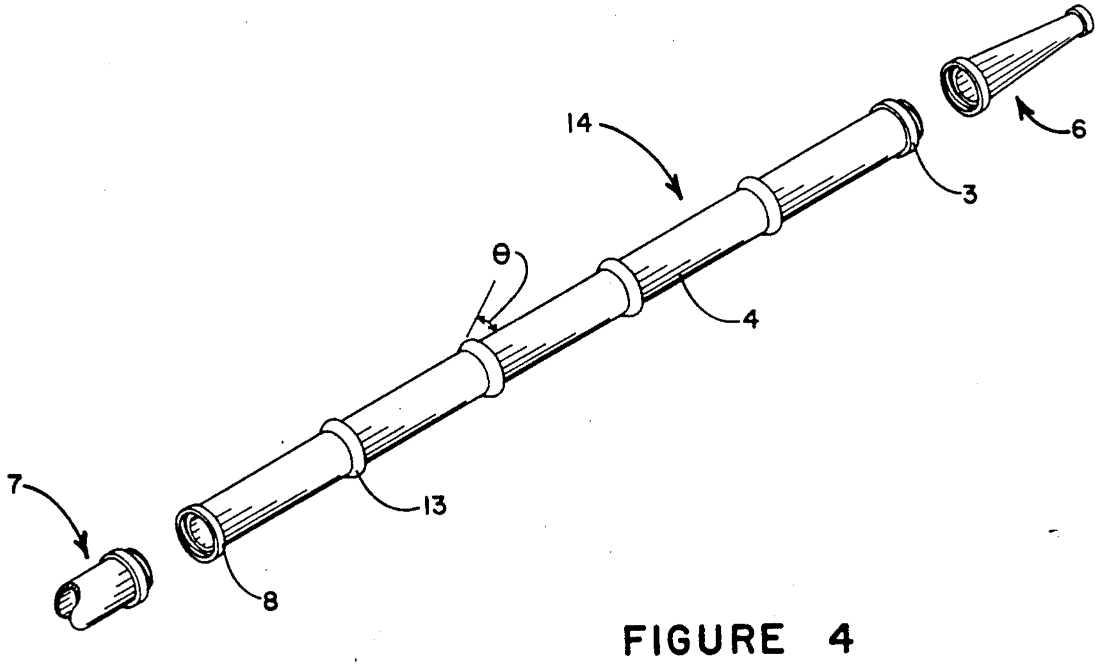
FIG. 4 is an exploded view of a fourth embodiment of a directional fire hose and nozzle made in accordance with the principles of the present invention.

FIG. 4 shows a fourth embodiment 14 of a fire hose made in accordance with the principles of the present invention. The fourth embodiment 14 is the same as the third embodiment 12, except that the annular members 13 incline in the opposite direction. The value of theta is from zero to about seventy degrees, preferably from about twenty to about seventy degrees, even more preferably from about thirty to about sixty degrees, and most preferably from about forty to about fifty degrees. The annular members 13 perform the same function in the same way as the fibers 5 in the second embodiment 10. For obvious reasons, embodiment 12 is preferred over embodiment 14.

The fibers 5 and annular members 13 are attached or fastened to the outer surface of the fire hose 4 by any suitable method. Many such methods are known in the art.

Figure 5:
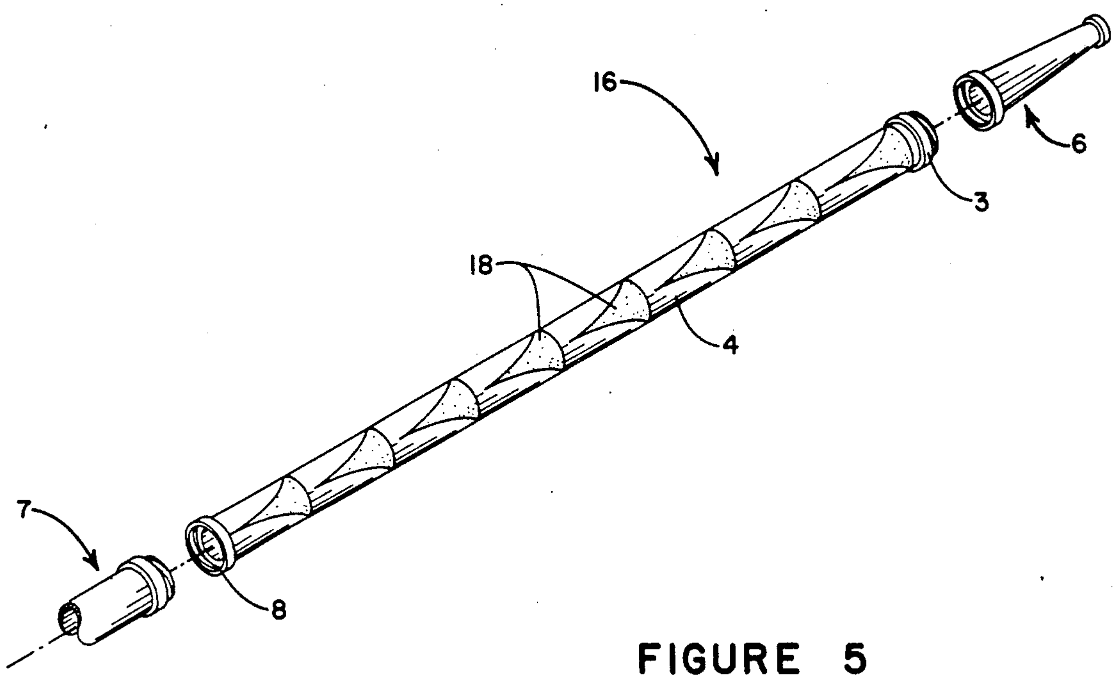
FIG. 5 is an exploded view of a fifth embodiment of a directional fire hose and nozzle made in accordance with the principles of the present invention.
Figure 6:
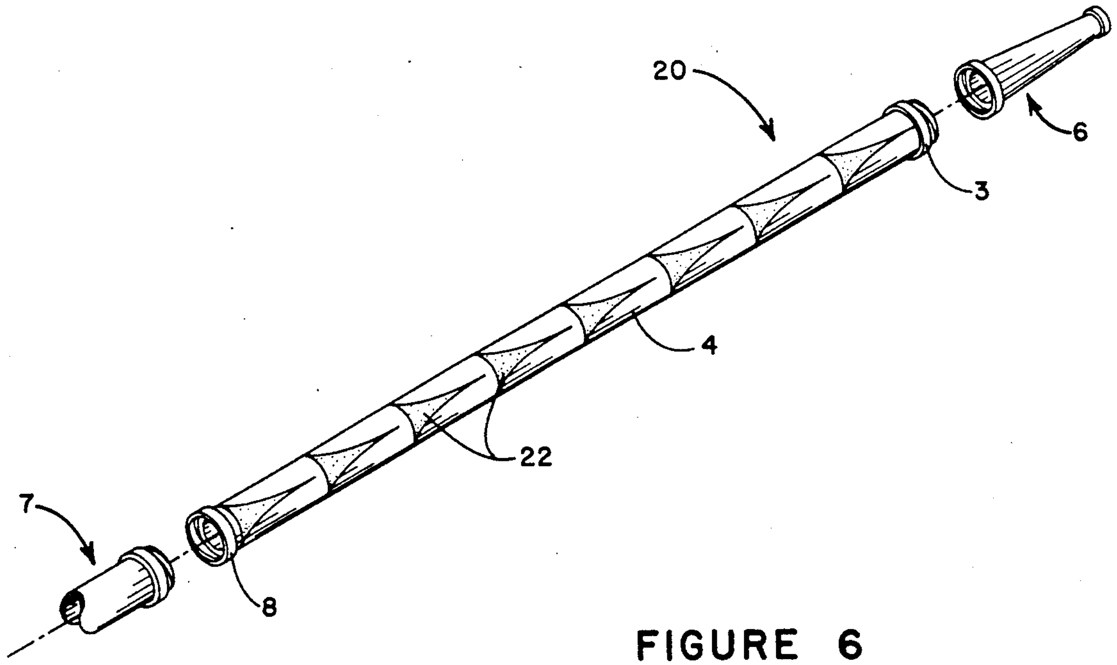
FIG. 6 is an exploded view of a sixth embodiment of a directional fire hose and nozzle made in accordance with the principles of the present invention.

Reference is now made to FIGS. 5 and 6, which show fifth and sixth embodiments 16 and 20, respectively, of a fire hose made in accordance with the principles of the present invention. In the fifth embodiment 16, a stripe 18 is repetitively painted, coated, or otherwise attached to the outer surface of the fire hose 16. The stripe 18 tapers from wide to narrow in the general direction of the first end 8 of the fire hose 16, thereby indicating that water and safety lie in that direction. In order for the stripe 18 to be visible under dark and smoky conditions,. the stripe 18 is made from a luminous material or luminous paint. By "luminous" is meant that the material or paint glows in the dark; a variety of such materials are known, some of which are fluorescent and some of which are phosphorescent.

A sixth embodiment 20 of a fire hose made in accordance with the principles of the present invention is shown in FIG. 6. The sixth embodiment 20 differs from the fifth embodiment 16 by having the stripe 22 taper from wide to narrow in the general direction of the second end 3 of the hose 20. A person wishing to escape the fire would follow the hose 20 in the opposite direction Embodiment 16 is preferred over embodiment 20.

Figure 7:
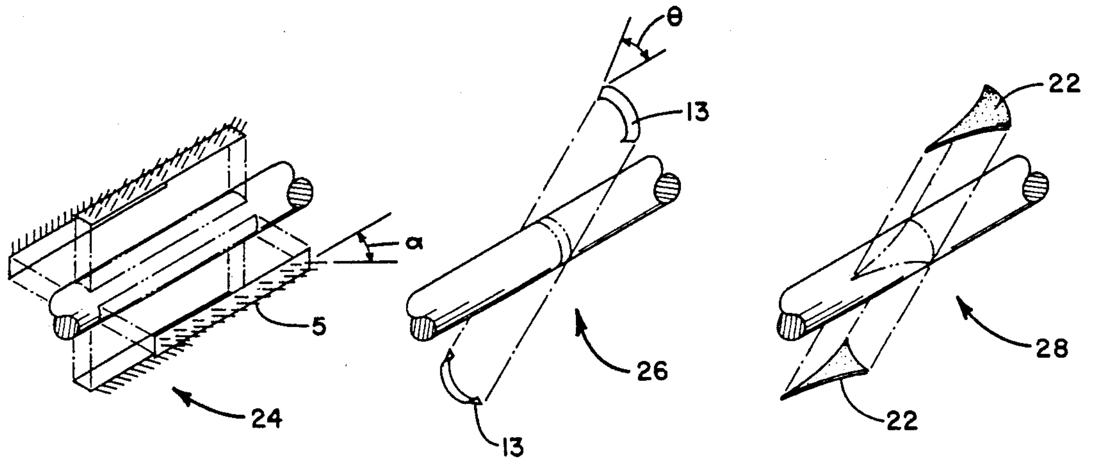
FIG. 7 is a schematic representation of three embodiments of an article for converting a fire hose into a directional fire hose made in accordance with the principles of the present invention.

Reference is now made to FIG. 7, wherein are shown several embodiments of an article for converting a fire hose into a directional fire hose made in accordance with the principles of the present invention.

A first embodiment 24 of the article comprises a strip of plastic, cotton, or cloth to the outer surface of which are attached a plurality of fire-resistant fibers 5. The inner surface of the strip 24 is coated with a layer of an adhesive material whereby the strip 24 is attachable to the outer surface of a fire hose 4, thereby converting the fire hose 4 into a directional fire hose similar to those shown in FIGS. 1 and 2 at 2 and 10, respectively. The orientation of the fibers 5 is as described for the directional fire hoses 2 and 10.

A second embodiment of the article comprises annular members 26 and **26*a* adapted for attachment to the outer surface of a fire hose 4, for converting the fire hose 4 into a directional fire hose similar to those shown in FIGS. 3 and 4 at 12 and 14, respectively. The orientation of the annular members 26 and 26*a* with respect to the outer surface of the fire hose 4 is as described for the directional fire hoses 12 and 14**.

The annular member 26 includes an opening **26*b* in the circumference of the annular member 26, whereby the member 26 can be slipped over the hose 4 and thereafter held in place by the natural tension of the member 26**.

The annular members **26*a*** are semicircular members which can be fastened to one another around the circumference of the hose by, e.g., a clasp or clip.

A third embodiment of the article comprises a substantially triangular strip 28 of plastic, cotton, or cloth. The outer surface of the strip 28 is coated with a fire-resistant luminous material. The inner surface of the strip 28 is coated with an adhesive material, whereby the strip 28 is attachable to the outer surface of the hose 4, thereby converting the hose 4 into a directional fire hose similar to those shown at 16 and 20 in FIGS. 5 and 6, respectively.

The articles 24, 26, 26a and 28 are shown in phantom outline after attachment to the fire hose 4.

Attachment of the articles 24 and 28 to the fire hose 4 may be, as suggested, by adhesion. The adhesive material may be of the general kind, i.e. requiring no heat; or it may be of the heat-sensitive type, which requires heat. In the latter case the articles 24 and 28 may be ironed on to the surface of the hose 4, using a hot iron. Alternatively, the articles 24 and 28 may be sewed onto the outer surface of the hose 4, in which case no adhesive layer is required.

Figure 8:
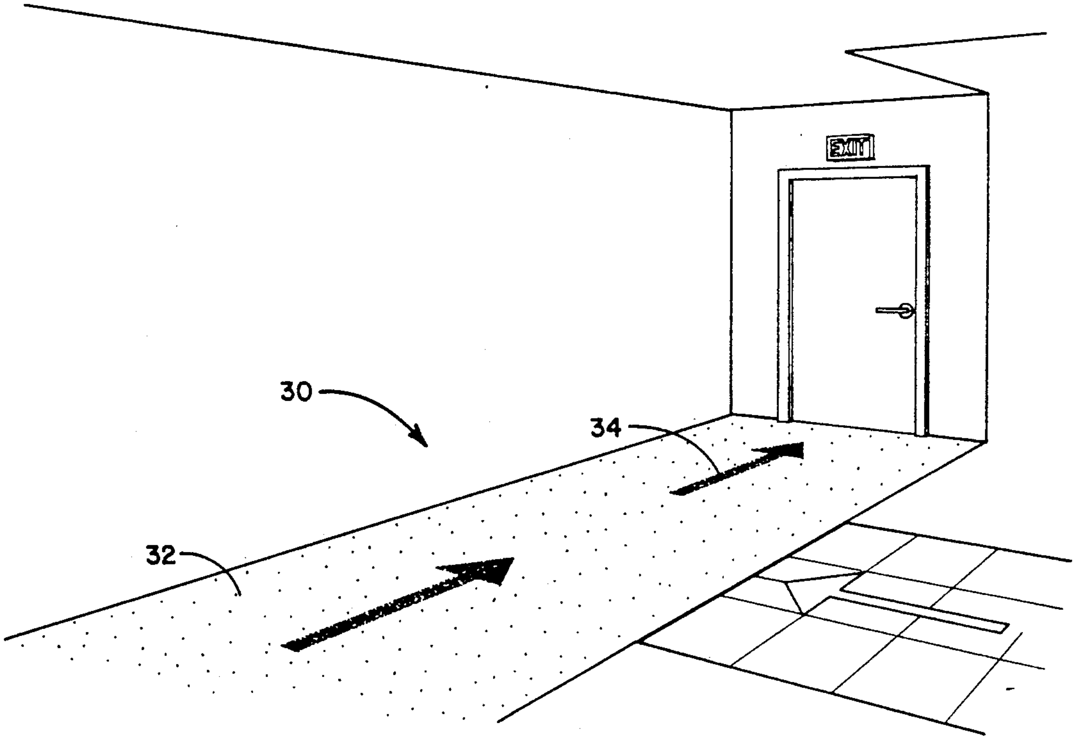
FIG. 8 is a plan view of a directional carpet made in accordance with the principles of the present invention.

Reference is now made to FIG. 8, in which is shown a directional carpet made in accordance with the principles of the present invention, and generally designated by the numeral 30. The directional carpet 30 comprises a carpet 32 the upper surface of which includes a plurality of arrows 34 or the like pointing in the same general direction. The arrows 34 are made of a luminous material, so that they are visible in the dark. The carpet 30 is laid down in such a manner that the arrows point in and indicate the general direction of maximum safety, and away from a probable source of fire. The directional carpet 30 thus enables persons threatened by a fire inside a building to escape the fire by following the arrows. Significantly, the disposition of the arrows on the upper surface of the carpet 32 beneficially enables persons seeking escape from a fire to make their escape on their hands and knees, keeping close to the floor—the recommended procedure in such a situation.

The directional carpet 30 is shown against a background which includes a floor 36, walls 38 and 40, and an exit door 42 leading to the outside of the building. The carpet 32 may also represent a tile floor 32 which includes the luminous arrows 34.

We claim:

1. A directional fire hose, comprising:

(a) a fire hose having first and second ends, the first end of the hose adapted for connection to a source of water, and the second end of the hose adapted for connection to a nozzle; and (b) directional means for determining, in a dark and smoke-filled environment caused by a fire, the direction of the first and second ends of the hose, thereby enabling a person to escape from the fire by following the hose toward the first end of the hose in a direction toward the end of the hose more distant from the fire;

the directional means including a plurality of fire-resistant fibers attached to the outer surface of the hose, the fibers characterized as (c) defining an acute angle with the surface of the hose;

(d) being inclined toward and pointing toward the first end of the hose;

(e) being sufficiently stiff to maintain a substantially constant angle with the surface of the hose; and (f) effectively forming a brush surface surrounding the hose, the brush surface characterized as being smooth to touch in the direction of the first end of the hose, and rough to touch in the direction of the second end of the hose.

2. The directional fire hose of claim 1, wherein the fibers are made from poly(tetrafluoroethylene).

3. The directional fire hose of claim 1, wherein the fibers define an angle of from about thirty to about sixty degrees with the outer surface of the hose.

4. In a directional fire hose having first and second ends, the first end of the hose being adapted for connection to a source of water, and the second end of the hose being adapted for connection to a nozzle, the hose including directional means for determining, in a smoke-filled environment caused by a fire, the direction of the first end of the hose, thereby enabling a person to escape from the fire by following the hose toward the first end of the hose in a direction toward the end of the hose more distant from the fire, the improvement comprising: a plurality of fire-resistant fibers attached to the outer surface of the hose, the fibers being characterized as (a) defining an acute angle with the surface of the hose;

(b) being inclined toward and pointing toward the first end of the hose;

(c) being sufficiently stiff to maintain a substantially constant angle with the surface of the hose; and (d) effectively forming a brush surface surrounding the hose, the brush surface characterized as being smooth to touch in the direction of the first end of the hose, and rough to touch in the direction of the second end of the hose.

5. The directional fire hose of claim 4, wherein the fibers are made from poly(tetrafluoroethylene).

6. The directional fire hose of claim 4, wherein the fibers define an angle of from about thirty to about sixty degrees with the outer surface of the hose.

* * * * *